United States Patent [19]
Hunter et al.

[11] Patent Number: 6,126,859
[45] Date of Patent: Oct. 3, 2000

[54] METHOD AND COMPOSITION FOR CORROSION AND DEPOSITION INHIBITION IN AQUEOUS SYSTEMS

[75] Inventors: Matthew M. Hunter, Holland; Gregory J. Pomrink, Lansdale; Stephen M. Kessler, Fairless Hills; Bruce K. Fillipo, Hatboro, all of Pa.

[73] Assignee: BetzDearborn Inc., Trevose, Pa.

[21] Appl. No.: 09/196,937

[22] Filed: Nov. 20, 1998

[51] Int. Cl.⁷ .................................. C02F 5/10; C09K 3/00
[52] U.S. Cl. ................... 252/389.52; 252/389.53; 252/389.54; 210/698
[58] Field of Search ................. 252/389.52, 389.53, 252/389.54; 210/698

[56] References Cited

U.S. PATENT DOCUMENTS

| | | | |
|---|---|---|---|
| 4,086,181 | 4/1978 | Suen et al. | 252/396 |
| 4,089,651 | 5/1978 | Scott . | |
| 4,411,865 | 10/1983 | Geiger et al. . | |
| 4,497,713 | 2/1985 | Geiger . | |
| 4,512,552 | 4/1985 | Katayama et al. . | |
| 4,529,572 | 7/1985 | Romberger et al. . | |
| 4,659,482 | 4/1987 | Chen . | |
| 4,663,053 | 5/1987 | Geiger . | |
| 5,034,155 | 7/1991 | Soeder et al. | 252/389.54 |
| 5,062,962 | 11/1991 | Brown et al. . | |
| 5,169,563 | 12/1992 | Katayama et al. | 252/389.53 |
| 5,320,779 | 6/1994 | Fivizzani . | |
| 5,518,629 | 5/1996 | Perez et al. | 252/392 |
| 5,866,011 | 2/1999 | McGiffney | 210/698 |
| 5,866,042 | 2/1999 | Chen et al. | 252/389.53 |

*Primary Examiner*—Jacqueline V. Howard
*Attorney, Agent, or Firm*—Steven D. Boyd

[57] ABSTRACT

A method of stabilizing aqueous system solubility of a transition metal salt, polymeric agent corrosion/deposition control combination at neutral pH is disclosed. The addition of an aliphatic hydroxycarboxylic acid to such corrosion/deposition control combinations was found to enhance corrosion/deposition inhibition while providing for a stabile combination at neutral pH.

12 Claims, No Drawings

METHOD AND COMPOSITION FOR CORROSION AND DEPOSITION INHIBITION IN AQUEOUS SYSTEMS

FIELD OF THE INVENTION

The present invention is directed to a composition and method for inhibiting corrosion and deposition in aqueous systems. More particularly, the present invention relates to a stable, neutral pH, divalent transition metal containing corrosion and deposition inhibiting treatment for aqueous systems, such as industrial water systems.

BACKGROUND OF THE INVENTION

The ability of zinc to inhibit corrosion of ferrous metals is well known. Accordingly, soluble zinc salts are vital ingredients of many corrosion treatment programs. An art recognized problem associated with zinc-containing treatments, particularly In cooling water, is the uncontrolled precipitation of zinc salts. For example, the use of orthophosphate in combination with zinc as a cooling water treatment is known. When orthophosphate and zinc are both present in an aqueous system, zinc phosphate precipitation becomes a concern. Precipitation of zinc in other forms, for example zinc hydroxide or zinc silicate can also occur. The solubility of the various salts, that is, the retention of the respective salt constituents in ionic form depends upon such factors as water temperature, pH and ion concentration. In alkaline waters, particularly above about pH 7.5 dissolved zinc tends to deposit out or drop out. Zinc salts are also known to be unstable in neutral or alkaline water and will precipitate with phosphates. Thus, if any of these conditions are present, the aqueous medium becomes prone to zinc precipitation. With the formation of zinc scale, many of the surfaces in contact with the aqueous medium will foul and the amount of effective (soluble) corrosion inhibitor present in the aqueous medium can be significantly reduced.

Attempts to control the stability problems commonly encountered in zinc-based water treatments have typically involved pH adjustment or stabilizers which tend to reduce corrosion inhibition efficacy. Most often alkalinity or acidity is employed to achieve even minimal stability for zinc-based treatments. In most cases of blends of zinc and polymers, precipitates (accelerated at low temperature, i.e., less than about 45° F.) composed primarily of zinc and calcium complexes form. Many additives have been investigated such as chelants and threshold inhibitors to alleviate precipitation problems in such products. Attempts to stabilize a neutral pH formulation with these types of additives have resulted in failure or stabilized formulations which have significantly reduced corrosion inhibition efficacy. The loss of corrosion inhibition efficacy is believed to be primarily due to insoluble zinc complex formation prior to product use.

Zincates are generally observed to be soluble and stable at low pH values (less than about pH 5) and often under highly alkaline (pH greater than 12) conditions. When the zincates are used in combination with polymeric materials which are stable at higher pH's such as poly (ether carboxylates) which are stable at pH's greater than 5, the expected pH range for stability of the mixture is pH 4 to 5. A neutral aqueous mixture would not be expected to show stability. The stability problems related to treatment component matrix and final product pH have made field application of certain zincate corrosion/deposition inhibitors difficult. Scaling of feed lines and equipment is not uncommon. The use of alkalinity or acidity to attempt to enhance product stability has been of limited success.

SUMMARY OF THE INVENTION

The present invention is directed to a divalent transition metal based corrosion/deposition inhibition mixture which is substantially phosphate free and stable at neutral pH. The present invention provides a transition salt and polymer containing corrosion/deposition inhibitor combination which incorporates an aliphatic hydroxy carboxylic acid as a stabilizer. The inclusion of the stabilizer provides for neutral pH stability of the combination as well as enhancing the corrosion inhibition efficacy of the combination. The preferred transition metal salt/polymer combination includes a water soluble divalent transition metal salt, a low molecular weight water soluble acrylate copolymer and a poly (ether carboxylate). This combination is stabilized at neutral pH by the addition of an aliphatic hydroxycarboxylic acid. The resulting corrosion/deposition inhibition combination is stable at neutral pH and exhibits enhanced corrosion inhibition efficacy.

DESCRIPTION OF THE PREFERRED EMBODIMENTS

The present invention provides a substantially phosphate-free neutral pH, stable transition metal salt/polymer corrosion/deposition inhibition combination for treatment of aqueous systems. The combination of the present invention avoids the use of acidity or alkalinity to provide product stability. The stability of the combination of the present invention avoids the field application problems of prior transition metal salt-based treatment combinations.

According to the present invention, a corrosion/deposition inhibiting combination for metal surfaces exposed to an aqueous system comprises (i) a water soluble divalent treatment metal salt, and a polymer component preferably (ii) a low molecular weight acrylate copolymer, and (iii) a poly (ether carboxylate) along with (iv) an aliphatic hydroxycarboxylic acid stabilizer. It was discovered that the inclusion of an aliphatic hydroxycarboxylic acid in the divalent transition metal salt/polymer mixture provided for stability at neutral pH while also enhancing corrosion inhibition.

The water soluble divalent transition metal salt of the present invention can include any metal salt which provides a divalent ion upon disassociation in water. A preferred example are water soluble zinc salts which provide $Zn^{+2}$ ions in aqueous solution. Convenient sources of such salts includes zinc oxide, zinc chloride, and zinc sulfate. The preferred source of the $Zn^{+2}$ ion is zinc sulfate.

The polymer component of the present invention includes any conventional corrosion/deposition inhibiting polymer or copolymer. Preferably, the polymer component is a combination of a poly(ether carboxylate) and a low molecular weight acrylate copolymer. The preferred poly (ether carboxylate) according to the present invention is preferably a polyepoxysuccinic acid of the general formula:

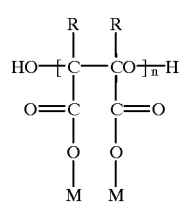

Formula I wherein n ranges from about 2–11, M is hydrogen or a water soluble cation such as $Na^+$, $NH_4^+$, or $K^+$ and R is hydrogen, C 1–4 alkyl or C1–4 substituted alkyl. Preferably R is hydrogen.

The preferred low molecular weight acrylate copolymer according to the present invention is preferably a polymer characterized by the structural formula:

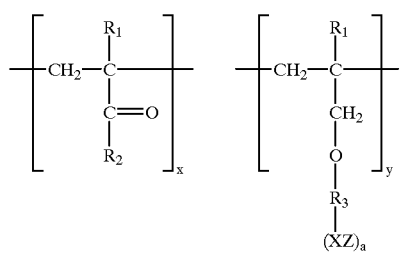

Formula II wherein $R_1$ is H or lower alkyl ($C_1$–$C_3$); $R_2$ is OH, $OM^1$ or $NH_2$; $M^1$ is a water soluble cation; $R_3$ is a hydroxy substituted alkyl or alkalene radical having from 1 to 6 carbon atoms or a non-substituted alkyl or alkalene radical having from 1 to about 6 carbon atoms; X, when present is an anionic radical selected from the group consisting of $SO_3$, $PO_3$, $PO_4$ and COO; Z, when present is hydrogen or any water soluble cation or cations which together counterbalance the valence of the anionic radical; a is 0 or 1.

The number average molecular weight of the water soluble copolymer of Formula II may fall within the range of about 1,000 to about 500,000 with the range of about 1,500 to about 10,000 being preferred. The molar ratio X:Y of the monomer of Formula II may fall within the range of about 30:1 to about 1:20 with the X:Y molar ratio range from about 10:1 to about 1:5 being preferred. A preferred polymer is:

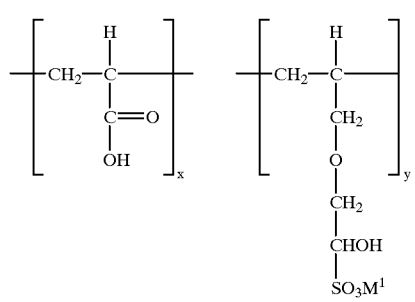

Formula III wherein M' is the same as given in Formula II above. This polymer (Formula III) is referred to as acrylic acid/allyl hydroxy propyl sulfonate ether (AA/AHPSE). The IUPAC nomenclature for AHPSE is 1-propane sulfonic acid, 2-hydroxy-3-(2-propenyl oxy)-mono sodium salt.

The aliphatic hydroxy carboxylic acid according to the present invention pr eferably has a carbon n umber of 7 or less. The material may be selected from the group gluconic acid, succinic acid, citric acid, maleic acid, glutaric acid, adipic acid, and mixtures thereof. Preferably the alphatic hydroxy carboxylic acid is citric acid.

The combination of a water soluble divalent transition metal salt, a low molecular weight acrylic copolymer, a poly (ether carboxylate), and an aliphatic hydroxy carboxylic acid of the present invention is adjusted to a neutral pH by the addition of an alkalyzing agent such as KOH.

A neutral pH, stable combination of the present invention may be used in combination with other water treatment agents including corrosion inhibitors, conventional scale and contamination inhibitors, metal ion sequestering agents, biocides and other conventional water treatment agents.

Generally, the corrosion/deposition inhibiting combination of the present invention is added to an aqueous system to be treated at concentrations ranging from about 5 ppm to about 500 ppm as product Preferably the treatment concentration of the combination of the present invention ranges from 5 ppm to about 200 ppm. Typical treatment concentrations for the individual preferred components of the combination of the present invention are as follows: from about 0.2 to 10 parts per million water soluble divalent transition metal salt; from about 2 to about 20 parts per million low molecular weight acrylic copolymers; from about 2 to about 20 parts per million poly (ether carboxylate); and from about 0.5 to about 20 parts per million aliphatic hydroxy carboxylic acid. The ratio of the aliphatic hydroxy carboxylic acid to the divalent metal salt is preferably about 2:1. The ratio of the water soluble acrylate copolymer to the divalent transition metal salt (on an active basis) preferably ranges from about 3:1 to about 6:1. The poly (ether carboxylate) is used in a polymer to active divalent metal in a ratio in a range from about 3:1 to about 8:1.

EXAMPLE

The present invention will now be further described with reference to a number of specific examples which are to be regarded solely as illustrative, and not as restricting the scope of the present invention.

Testing was undertaken in a laboratory scale recirculating heat transfer apparatus. The corrosion inhibiting activity of a treatment comprising 6 parts per million polyexpoxysuccinic acid, 8 parts per million acrylic acid/allyl hydroxy propyl sulfonate ether; 1.5 parts per million as zinc sulfate monohydrate when applied at a 100 parts per million dosage both with and without about 5% citric acid. These treatment combinations were added to a recirculating cooling water containing 400 parts per million Ca, 150 parts per million Mg, 210 parts per million M-alkalinity (as $CaCO_3$), 2 parts per million orthophosphate and 51 parts per million $SiO_2$ at pH 8.6 in a specific conductance of about 2,200 microohms. The metallurgy tested included low carbon steel (LCS) coupons and an LCS heat transfer probe which generated a heat flux of 8,000 BTU/square feet per hour. The bulk water temperature was 120° F., and water velocity was at 2.8 feet per second. Retention time was 1.4 days. Table 1 summarizes the test results.

TABLE 1

| Product | LCS (mpy) | LCS Appearance | | | |
|---|---|---|---|---|---|
| | | Coupon Pitting | | Heat Transfer Pitting | |
| | | Density | Depth | Density | Depth |
| Without Citric Acid | 0.5 | 1 × 10⁴/m² | N/A | 1 × 10⁴/m² | 26 micron |
| With Citric Acid | 0.2 | clean | N/A | clean | N/A |

The data in Table 1 shows that the addition of an aliphatic hydroxycarboxylic acid to the treatment combination enhanced the overall corrosion inhibition as well as decreasing the pitting corrosion. The aliphatic hydroxycarboxylic acid also allows adjustment to neutral pH with no adverse impact on product stability.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of maintaining aqueous system solubility stability of a corrosion and deposition inhibiting composition adjusted to a neutral pH consisting essentially of a polymer and/or copolymer and a transition metal salt comprising adding to a corrosion and deposition inhibiting composition adjusted to a neutral pH consisting essentially of a polymer and/or copolymer and a transition metal salt an effective amount for the purpose of maintaining solubility stability at neutral pH of an aliphatic hydroxycarboxylic acid.

2. The method of claim 1 wherein said aliphatic hydroxy carboxylic acid is selected from the group consisting of gluconic acid, succinic acid, citric acid, maleic acid, glutaric acid, adipic acid and mixtures thereof.

3. The method of claim 1 wherein said transition metal salt containing corrosion/deposition control agent comprises:
   i) a divalent transition metal salt;
   ii) a low molecular weight water soluble acrylate copolymer; and
   iii) a poly(ether carboxylate).

4. The method of claim 3 wherein said divalent transition metal salt is a water soluble zinc salt.

5. The method of claim 3 wherein said low molecular weight water soluble acrylate copolymer is a copolymer having the formula:

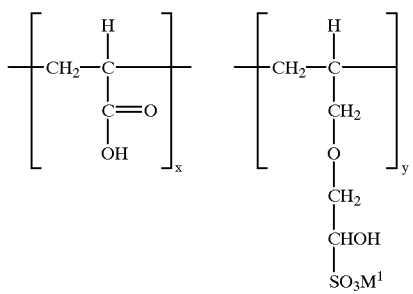

Formula III wherein $M^1$ is a water soluble cation; the molar ratio x:y is from about 3:1–6:1; and the number average molecular weight of said copolymer is from about 5,000 to 10,000.

6. The method of claim 3 wherein said poly(ether carboxylate) is a polyepoxysuccinic acid of the formula:

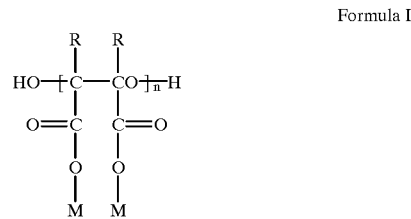

Formula I wherein n ranges from about 2–11, M is hydrogen or a water soluble cation and R is hydrogen, C1–4 alkyl or C1–4 substituted alkyl.

7. A solubility stabilized, neutral pH corrosion/deposition inhibiting composition, consisting essentially of
   i) a divalent transition metal salt;
   ii) a polymeric corrosion/deposition inhibiting component; and
   iii) an aliphatic hydroxy carboxylic acid.

8. The corrosion/deposition inhibiting composition of claim 7 wherein said divalent transition metal salt is a water soluble zinc salt.

9. The corrosion/deposition inhibiting composition of claim 7 wherein said polymeric corrosion/deposition inhibiting component comprising:
   i) a low molecular weight water soluble acrylate copolymer; and
   ii) a poly(ether carboxylate).

10. The corrosion/deposition inhibiting composition of claim 9 wherein said low molecular weight water soluble acrylate copolymer is a copolymer having the formula:

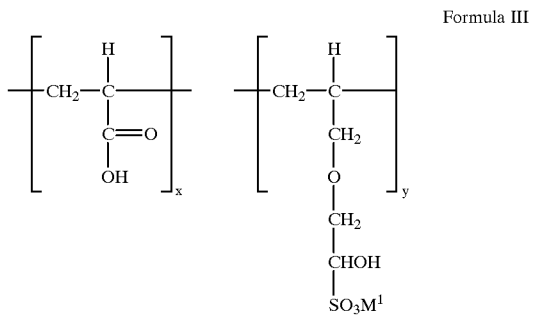

Formula III wherein $M^1$ is a water soluble cation; the molar ratio x:y is from about 3:1–6:1; and the number average molecular weight of said copolymer is from about 5,000 to 10,000.

11. The corrosion/deposition inhibiting composition of claim 9 wherein said poly(ether carboxylate) is a polyepoxysuccinic acid of the formula:

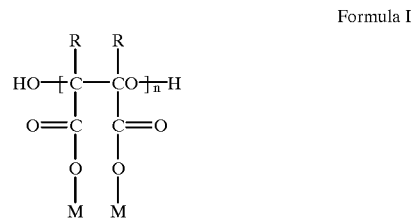

Formula I wherein n ranges from about 2–11, M is hydrogen or a water soluble cation and R is hydrogen, C1–4 alkyl or C1–4 substituted alkyl.

12. The corrosion/deposition inhibiting composition of claim 7 wherein said aliphatic hydroxy carboxylic acid is selected from the group consisting of gluconic acid, succinic acid, citric acid, maleic acid, glutaric acid, adipic acid and mixtures thereof.

* * * * *